(12) United States Patent
Sterner et al.

(10) Patent No.: US 8,631,910 B2
(45) Date of Patent: Jan. 21, 2014

(54) DEVICE FOR COLLECTING A TRAILING CABLE

(75) Inventors: Richard Sterner, Wolkertshofen (DE); Ulrich Graf, Donauwoerth (DE)

(73) Assignee: GEDA Dechentreiter GmbH & Co. KG, Asbach-Baeumenheim (DE)

( * ) Notice: Subject to any disclaimer, the term of this patent is extended or adjusted under 35 U.S.C. 154(b) by 493 days.

(21) Appl. No.: 12/740,279

(22) PCT Filed: Oct. 28, 2008

(86) PCT No.: PCT/EP2008/009098
§ 371 (c)(1),
(2), (4) Date: Jun. 21, 2010

(87) PCT Pub. No.: WO2009/056276
PCT Pub. Date: May 7, 2009

(65) Prior Publication Data
US 2010/0243382 A1    Sep. 30, 2010

(30) Foreign Application Priority Data

Oct. 29, 2007   (DE) .................... 20 2007 015 008 U

(51) Int. Cl.
*B65H 75/36*          (2006.01)
(52) U.S. Cl.
USPC ........................................................ 187/413

(58) Field of Classification Search
USPC ............. 187/413, 414; 242/388.9; 226/118.4; 248/51, 52, 75
See application file for complete search history.

(56) References Cited

U.S. PATENT DOCUMENTS

| | | | | |
|---|---|---|---|---|
| 2,266,334 A * | 12/1941 | Rice | ............................... | 224/655 |
| 2,826,479 A * | 3/1958 | Cole | ............................... | 8/152 |
| 3,123,268 A * | 3/1964 | Gagg | ............................... | 226/111 |
| 6,109,544 A * | 8/2000 | Sheng | ............................ | 239/195 |
| 6,378,751 B1 * | 4/2002 | Ring | ........................... | 226/118.4 |
| 6,622,619 B1 * | 9/2003 | Liu et al. | ............................ | 100/4 |
| 7,441,578 B2 * | 10/2008 | Mainous et al. | ............... | 156/360 |
| 7,798,060 B2 * | 9/2010 | Pearson et al. | ................... | 100/26 |

FOREIGN PATENT DOCUMENTS

| | | |
|---|---|---|
| DE | 36 04 094 C1 | 4/1987 |
| DE | 295 00 430 U1 | 2/1995 |
| FR | 1 424 449 A | 1/1966 |

* cited by examiner

*Primary Examiner* — William A Rivera
*Assistant Examiner* — Michael Riegelman
(74) *Attorney, Agent, or Firm* — Robert Curcio; DeLio & Peterson, LLC

(57) ABSTRACT

In a device for collecting a trailing cable, particularly of a construction lift, having cable tray comprising an opening through which the trailing cable can be deposited into or guided out from the cable tray, the cable tray has an elongated cross-section and is disposed and configured such that the trailing cable can be deposited in the cable tray in meanders.

17 Claims, 3 Drawing Sheets

DEVICE FOR COLLECTING A TRAILING CABLE

CROSS REFERENCE TO RELATED APPLICATION

This application is a National Phase filing under 35 U.S.C. §371 of PCT/EP2008/009098 which was filed Oct. 28, 2008, and claims priority to German Application No. DE 20 2007 015 008.3 filed Oct. 29, 2007.

BACKGROUND OF THE INVENTION

1. Field of the Invention

The invention relates to a device for collecting a trailing cable, in particular of a construction elevator, according to the preamble of claim 1.

2. Description of Related Art

A device such as this is known from practical use. In the case of construction elevators, the trailing cable connects a power source at the bottom to the drive unit of a lifting cab which can be moved up and down along a ladder or a mast. The arrangement is normally designed such that this trailing cable hangs down loosely from the lifting cab and from its drive unit and is withdrawn or pulled out of the device for collecting the trailing cable to a greater or lesser extent depending on the respective height position of the lifting cab. In practice, a device such as this is, for example, in the form of a simple, round barrel, also referred to as a cable pot, which is open at the top.

One disadvantage in this case is that, although the round cable, which is used in practice and hangs down loosely, is in general guided as it enters the cable pot, it is, however, placed in an uncontrolled manner in the cable pot and comes to rest twisted to a greater or lesser extent in the cable pot after a number of load cycles. In the end, this increases the risk of deformation caused by shifting of the cable assembly, or even the risk of the trailing cable breaking, which can lead to a shorter operating time and therefore to a decreasing life of the cable. In addition, a cable pot of the abovementioned type occupies a large amount of space on the ground.

SUMMARY OF THE INVENTION

The invention is based on the object of providing a device of the type mentioned initially in which the handling of the trailing cable is improved, and its life is therefore increased.

According to the invention, this object is achieved by a device having the features of claim 1.

Advantageous developments are the subject matter of the dependent claims.

Still other objects and advantages of the invention will in part be obvious and will in part be apparent from the specification.

The above and other objects, which will be apparent to those skilled in the art, are achieved in the present invention which is directed to a device for collecting a trailing cable of an elevator, in particular a construction elevator, having a cable pot which has an opening at its upper edge, through which the trailing cable can be placed in the cable pot or can be pulled out of it, characterized in that the trailing cable is a ribbon cable with a narrow face and a broad face and the narrow face of the ribbon cable runs approximately parallel to the longitudinal axis of the cable pot, therein, and in that the cable pot has an elongated cross section and is arranged and designed such that the trailing cable can be placed in meanders in the cable pot.

In a second aspect, the present invention is directed to an elevator cable collection system comprising: a trailing cable affixed at one end to the elevator, and an opposite end collected within a cable pot when the elevator descends, the trailing cable having a narrow face and a broad face; and the cable pot having a height, depth, and width, and including an opening at its upper edge through which the trailing cable is received by the cable pot when the elevator descends and through which the trailing cable is removed from the cable pot when the elevator ascends, the cable pot opening having an approximate rectangular cross section with an elongated side in the direction of, and approximately parallel to, the cable pot width, and a shorter side in the direction of, and approximately parallel to, the cable pot depth, the cable pot height, width, and depth dimensions configured such that the trailing cable is placed in meanders in the cable pot when the elevator descends and the trailing cable is lowered into the cable pot.

BRIEF DESCRIPTION OF THE DRAWINGS

Embodiments of the subject matter of the invention will be explained in more detail in the following text with reference to the drawing, in which case all the features described and/or illustrated in the figures, in their own right or in any desired combination, form the subject matter of the present invention, irrespective of how they are combined in the claims or their back-references. The figures are for illustration purposes only and are not drawn to scale. In the figures:

DESCRIPTION OF THE PREFERRED EMBODIMENT(S)

Figure 1:
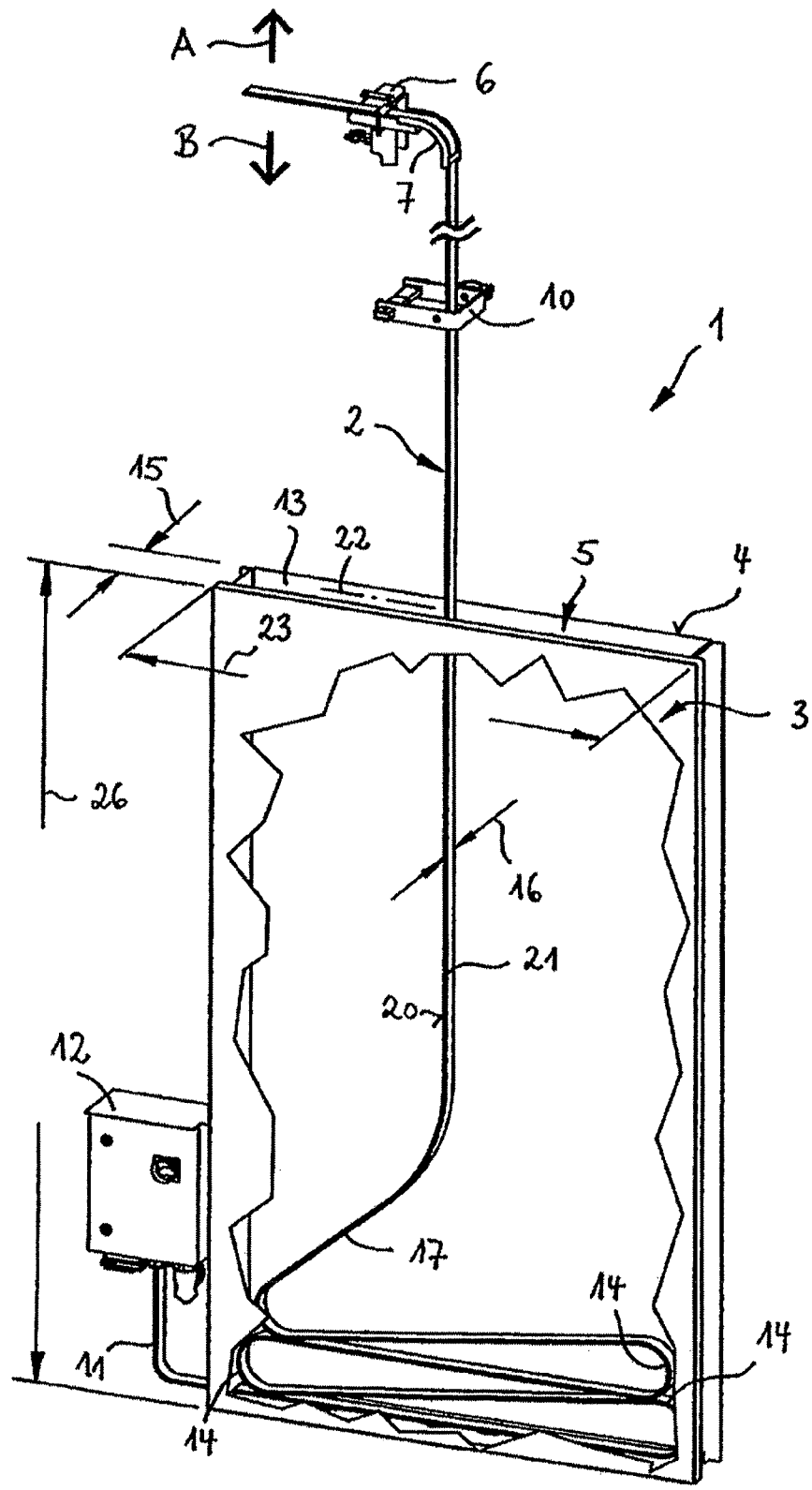
FIG. 1 shows a schematic, perspective view, illustrated partially cut open, of a device for collecting a trailing cable, in particular of a construction elevator.

In describing the preferred embodiment of the present invention, reference will be made herein to FIGS. 1-4 of the drawings in which like numerals refer to like features of the invention.

According to the invention, the cable pot has an elongated cross section and is arranged and designed such that the trailing cable can be placed in meanders in the cable pot. This allows the trailing cable to be placed in the cable pot in an organized manner, thus greatly decreasing or virtually completely avoiding the risk of twisting or rotation of the cable. One and the same trailing cable can therefore be used for a greater number of load cycles, thus improving the life of the cable. Since rotation of the cable, as mentioned above, is effectively reduced or precluded, the device according to the invention enables greater construction heights of the elevator, in particular the construction elevator. Furthermore, a cable pot designed in this way occupies less space on the ground since its depth can be designed to be considerably less than, for example, the diameter of a conventional, round cable pot.

The meanders of the trailing cable which are formed in the cable pot are advantageously arranged such that they lie one on top of the other. The space available in the cable pot for storing the trailing cable can thus be utilized well for holding the cable. In contrast to the situation in a conventional cable pot, the trailing cable which has been placed in the cable pot extends essentially over the entire elongated cross section of the cable pot, thus in the end allowing the reduced space requirement mentioned above. To this extent, the trailing cable can be placed considerably "more densely" in the cable pot with the device according to the invention, and therefore more densely "packaged" than in a conventional, round cable pot.

According to one particularly preferred embodiment of the invention, the trailing cable is a ribbon cable with a narrow face and a broad face, the narrow face of the ribbon cable running approximately parallel to the longitudinal axis of the cable pot, therein. A ribbon cable such as this allows a considerably greater number of load cycles than a conventional round cable. The latter exhibit considerable traces of use after only about 5000 load cycles, or are already sufficiently damaged after this number of load cycles that they can no longer be used in practice. In contrast to this, a ribbon cable according to the invention allows at least 20 000 load cycles, as a result of which a cable such as this can be used considerably more economically than a conventional cable. Furthermore, when using a ribbon cable, the risk of rotation of the cable is reduced even further, as a result of which, when using a ribbon cable, it is possible to achieve greater construction heights than when using a round cable. The device according to the invention can therefore be used considerably more economically than a conventional device. Particularly when using a ribbon cable, the cable pot according to the invention can be designed to be extremely flat, that is to say shallow, thus likewise improving the handling of the device according to the invention.

The cable pot advantageously has a rectangular cross section, wherein the ratio of the cable pot width to the cable pot depth is approximately 5:1 to 15:1, preferably approximately 10:1. The chosen ratios of the cable pot width to depth make it possible to tell how elongated and therefore how narrow the cable pot can be designed to be in comparison to its width.

According to another development of the invention, the cable pot depth and cable pot width decrease with increasing flexibility and therefore with decreasing Shore hardness of the trailing cable. This makes it possible to further reduce the space required by the device according to the invention. On the other hand, at least the basic direction of the dimensions of the cable pot was also proposed thereby, if the aim is to use a more flexible or stiffer cable in an existing device.

According to another preferred embodiment of the invention, the ratio of the cable pot depth to the thickness of the trailing cable is approximately 8:1 to 22:1, preferably 10:1 to 20:1, particularly preferably 15:1, in which case it is clear that the minimum cable pot depth is greater than the width of the trailing cable. A further relationship relating to the dimensions of the cable pot is stated as a function of the configuration of the trailing cable.

FIG. 1 schematically illustrates a perspective view, illustrated partially cut open, of a device 1 for collecting a trailing cable 2, in particular but not exclusively of a construction elevator, which is not illustrated in any more detail.

The apparatus 1 has a cable pot 3 which has an opening 5 at its upper edge 4. The cross section of the opening 5 corresponds to that of the cable pot 3. The trailing cable 2 can be placed in the cable pot 3, or can be pulled out of it, through the opening 5, depending on whether a lifting cab, which is not shown any more detail, is moving upward in the direction of the arrow A or downward in the direction of the arrow B, that is to say toward the cable pot 3. It is clear that, when the lifting cab is moving in the direction of the arrow A, the trailing cable 2 is pulled out of the cable pot 3 and, when the lifting cab is moving in the opposite direction, in the direction of the arrow B, it is placed in the cable pot.

Only one trailing cable holder 6 is indicated schematically in FIG. 1, in the area of the upper end of the trailing cable 2, that is to say where the lifting cab, which is not shown in any more detail, is provided, and this trailing cable holder 6 is mounted on the lifting cab or on a car which is not shown in any more detail. The trailing cable 2 is introduced into the interior of the cable pot 3 via the opening 5 and via a curved rounded area 7 of the trailing cable holder 6 and a cable guide 10.

The lower end 11 of the trailing cable 2 is pulled out of the cable pot 3 and connected to a switchbox 12 which can be attached to the outside of the cable pot 3, as indicated schematically in FIG. 1.

According to the invention, the cable pot 3 has an elongated cross section 13, with the cable pot being arranged and designed such that the trailing cable 2 can be placed in meanders 14 in the cable pot 3. For the sake of simplicity, FIG. 1 shows only three meanders 14. As indicated in FIG. 1, the meanders 14 of the trailing cable 2 which are formed in the cable pot 3 are arranged such that they lie one on top of the other. To this extent, the depth 15 of the cable pot 3 is chosen and is matched to the width 16 of the trailing cable 3, such that the previously mentioned arrangement of the meanders 14 of the cable such that they lie one on top of the other automatically results when the cable is placed in the cable pot.

According to one particularly preferred embodiment of the invention, the trailing cable 2 is a ribbon cable 17 with a narrow face 20 and a broad face 21. The ribbon cable 17 is introduced into the cable pot 3 via the elongated cross section 13 such that the narrow face 20 of the ribbon cable 17 runs approximately parallel to its longitudinal axis 22, that is to say parallel to the width 23 of the cable pot, therein.

According to a likewise preferred embodiment of the invention, the cable pot 3 has a rectangular cross section 13, wherein the ratio of the cable pot width 23 to the cable pot depth 15 is approximately 5:1 to 15:1, preferably approximately 10:1. According to a further preferred embodiment of the invention, the cable pot depth 15 and cable pot width 23 decrease with increasing flexibility and therefore with decreasing Shore hardness of the trailing cable 2. The Shore hardness is a measure of the resistance of a material to the penetration of an object, and is expressed in non-dimensional Shore hardness units. A low Shore hardness corresponds to a rather soft or flexible material; conversely, a high Shore hardness corresponds to a rather hard or brittle, and therefore fairly inflexible, material. According to another preferred embodiment of the invention, the ratio of the cable pot depth 15 to the thickness 24 of the trailing cable 2, also referred to as the height of the trailing cable, is approximately 8:1 to 22:1, preferably 10:1 to 20:1, particularly preferably 15:1. Part of a trailing cable 2 in the form of a ribbon cable 17 is shown in section in FIG. 2. A plurality of electrical lines 25 pass through the ribbon cable 17, and extend in the longitudinal direction of the cable. The lines 25 are illustrated only schematically in FIG. 2 and, for example, comprise lines for supplying power to a drive unit that is not shown in any more detail, in particular for a construction elevator, which is not shown in any more detail, as well as lines by means of which the drive unit can be controlled. Furthermore, the ribbon cable may have lines for strain relief.

The elongated cross section 13 of the cable pot 3 may also, for example, be elliptical (not shown) or may have corners or ends rounded as a rectangular cross section.

Figure 2:
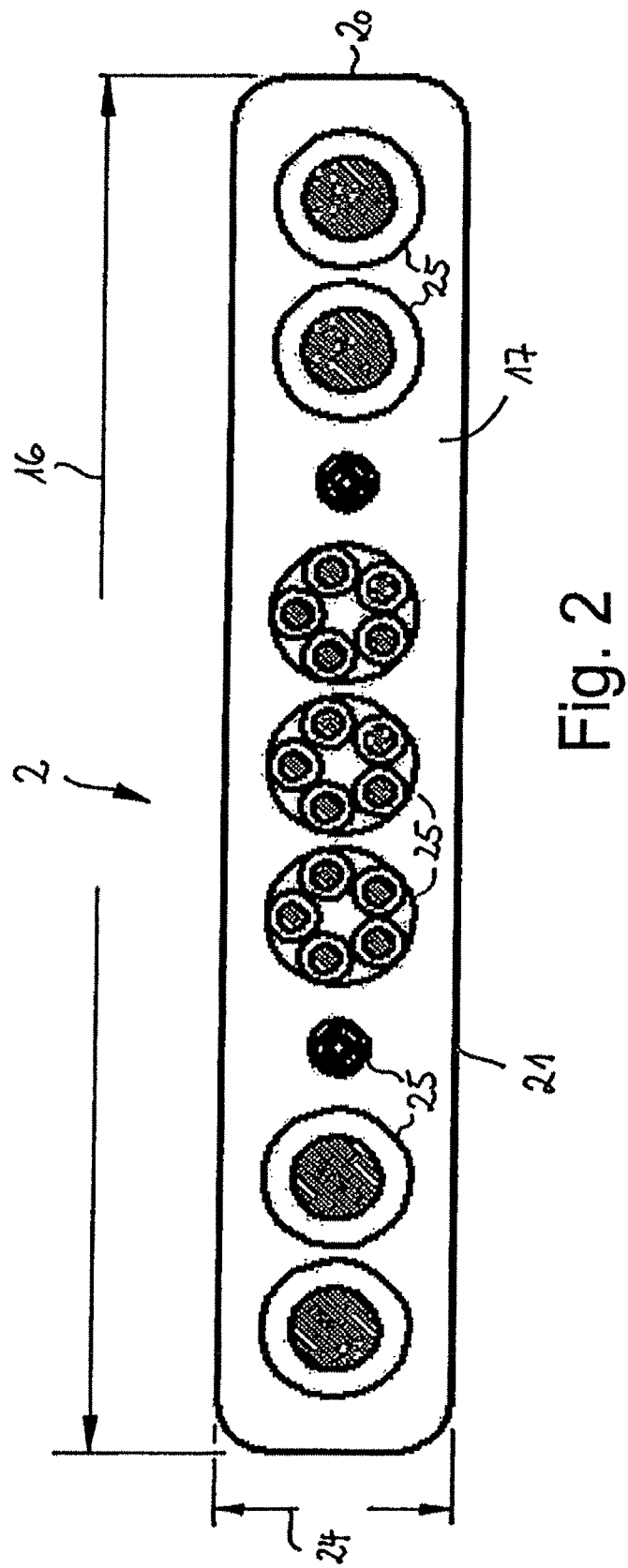
FIG. 2 shows a schematic, partial section through a trailing cable in the form of a ribbon cable.
Figure 3:
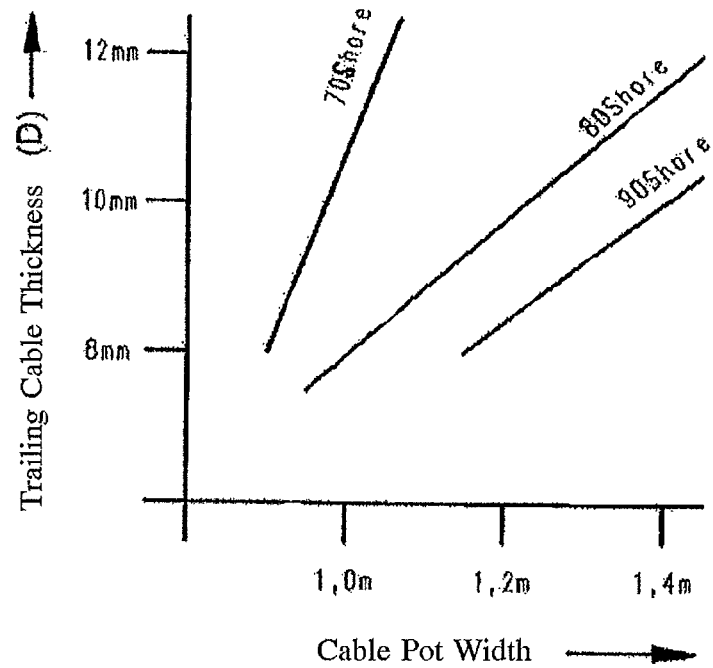
FIG. 3 shows a schematic diagram, in which the trailing cable thickness is plotted against the cable pot width as a function of the Shore hardness of the cable.

FIG. 3 schematically illustrates a diagram in which the thickness D of the trailing cable is plotted against the cable pot width. In FIGS. 1 and 2, the thickness of the trailing cable is annotated with the reference sign 24, and the width of the cable pot is annotated with the reference sign 23. This diagram can be used to determine the cable pot width in a simple manner for selected trailing cable thicknesses at specific cable Shore hardnesses. The cable pot width accordingly increases as the thickness increases and as the Shore hardness of the trailing cable increases.

Figure 4:
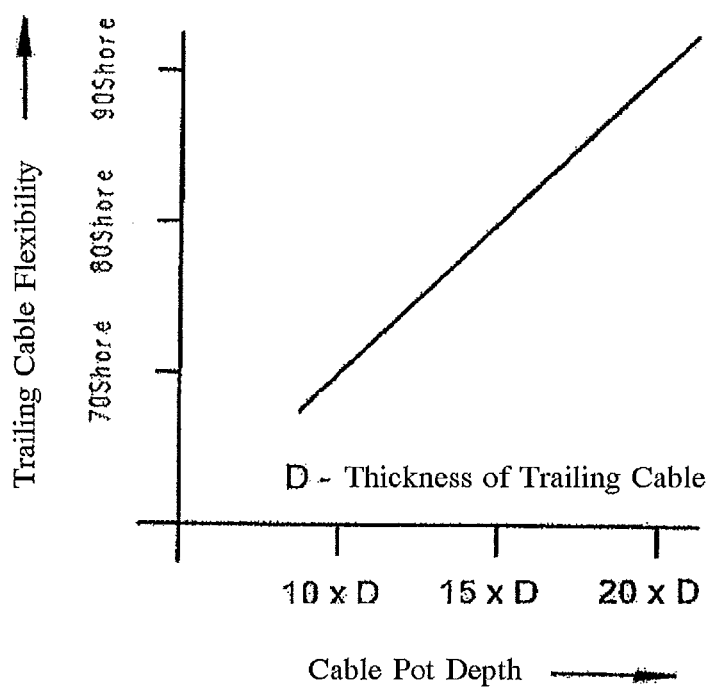
FIG. 4 shows a schematic diagram, in which the trailing cable flexibility is plotted against the cable pot depth.

FIG. 4 shows the dependency of the trailing cable flexibility on the cable pot depth at selected Shore hardnesses, in which the cable pot depth is indicated as the product of a factor with the thickness D of the trailing cable. It can be seen from FIG. 4 that the cable pot depth increases as the Shore hardness of the trailing cable increases and, as already mentioned, is for example between 8×D and 22×D, when D denotes the thickness of the trailing cable.

In general, it can be said that the smaller the arc of one of the meanders 14 in the pot, the narrower the cable pot can be designed. Therefore, the smaller the curve of the meander, the less is the depth 15 of the cable pot.

One example of a cable pot 3 has, for example, a height 26 of approximately 2.5 m, a width 23 of approximately 1.3 m and a depth 15 of a approximately 12 cm. Furthermore advantageously, the ribbon cable 17 has a thickness 24 of 8 mm and a width of 42 mm. The Shore hardness of the cable is normally between 65 and 95 Shore. The height 26 of the cable pot particularly advantageously corresponds to the height of ground-level fencing of the construction lift (not illustrated). It is obvious that the abovementioned dimensions have been quoted only as examples; different values may also be used, both for the stated dimensions and for the hardness of the cable.

This therefore results in a device for collecting a trailing cable, in particular but not exclusively of a construction elevator, in which the handling of the cable is considerably improved.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A device for collecting a trailing cable of an elevator, in particular a construction elevator, having a cable pot which has an opening at its upper edge, through which the trailing cable can be placed in the cable pot or can be pulled out of it, characterized in that the trailing cable is a ribbon cable with a narrow face and a broad face and the narrow face of the ribbon cable runs approximately parallel to the longitudinal axis of the cable pot, therein, and in that the cable pot has an elongated cross section with a lateral width perpendicular to said longitudinal axis of said cable pot, and said cable pot is arranged and designed such that said broad face of said ribbon cable is approximately equal in length to said lateral width of said cable pot, and upon gravity-fed insertion from above through an opening corresponding to said cross-section of the cable pot the trailing cable forms overlapping winding loops in the cable pot.

2. The device of claim 1, characterized in that the overlapping winding loops of the trailing cable which are formed in the cable pot are arranged such that they lay one on top of the other.

3. The device of claim 1, characterized in that the cross section of the opening corresponds to that of the cable pot.

4. The device of claim 3, characterized in that the cable pot has a rectangular cross section, wherein the ratio of the cable pot width to the cable pot depth is within a range of approximately 5:1 to 15:1.

5. The device of claim 3, characterized in that the cable pot has a rectangular cross section, wherein the ratio of the cable pot width to the cable pot depth is approximately 10:1.

6. The device of claim 1, characterized in that the cable pot has a rectangular cross section, wherein the ratio of the cable pot width to the cable pot depth is within a range of approximately 5:1 to 15:1.

7. The device of claim 6, characterized in that the cable pot depth and cable pot width decrease with increasing flexibility and therefore with decreasing Shore hardness of the trailing cable.

8. The device of claim 7, characterized in that the ratio of the cable pot depth to the thickness of the trailing cable is within the range of approximately 10:1 to 20:1.

9. The device of claim 6, characterized in that the ratio of the cable pot depth to the thickness of the trailing cable is approximately 8:1 to 22:1.

10. The device of claim 6, characterized in that the ratio of the cable pot depth to the thickness of the trailing cable is within the range of approximately 10:1 to 20:1.

11. The device of claim 6, characterized in that the ratio of the cable pot depth to the thickness of the trailing cable is approximately 15:1.

12. The device of claim 1, characterized in that the cable pot has a rectangular cross section, wherein the ratio of the cable pot width to the cable pot depth is approximately 10:1.

13. An elevator cable collection system comprising:
a trailing cable in the form of a ribbon cable, affixed at one end to said elevator, and an opposite end collected within a cable pot when said elevator descends, said trailing cable having a narrow face and a broad face; and
said cable pot having a height, depth, and width, and including an opening at its upper edge through which said trailing cable is received by said cable pot when said elevator descends and through which said trailing cable is removed from said cable pot when said elevator ascends, said cable pot opening having an approximate rectangular cross section with an elongated side in the direction of, and approximately parallel to, said cable pot width, and a shorter side in the direction of, and approximately parallel to, said cable pot depth, said cable pot height, width, and depth dimensions configured such that upon gravity-fed insertion from above through an opening corresponding to the cross-section of the cable pot said trailing cable forms overlapping winding loops in said cable pot when said elevator descends and said trailing cable is lowered into said cable pot.

14. The elevator cable collection system of claim 13 including having the ratio of said cable pot width to said cable pot depth within the range of approximately 5:1 to 15:1.

15. The elevator cable collection system of claim 13 including having said cable pot depth and said cable pot width decrease with increasing flexibility of said trailing cable or with decreasing Shore hardness of the trailing cable.

16. The elevator cable collection system of claim 13 including having the ratio of said cable pot depth to said trailing cable broad face length approximately within the range of 8:1 to 22:1.

17. The elevator cable collection system of claim 13 wherein said trailing cable comprises a ribbon cable.

* * * * *